United States Patent
Niekamp

(10) Patent No.: US 11,742,729 B2
(45) Date of Patent: Aug. 29, 2023

(54) DRIVE CIRCUIT FOR AN ACTUATOR, ACTUATOR DEVICE FOR ADJUSTING AN ADJUSTING ELEMENT, MANUFACTURING METHOD FOR PRODUCING A DRIVE CIRCUIT, AND A MOTOR VEHICLE COMPONENT PRODUCTED ACCORDING TO THE METHOD

(71) Applicant: Mahle International GmbH, Stuttgart (DE)

(72) Inventor: Peer Niekamp, Leutenbach (DE)

(73) Assignee: Mahle International GmbH

( * ) Notice: Subject to any disclaimer, the term of this patent is extended or adjusted under 35 U.S.C. 154(b) by 435 days.

(21) Appl. No.: 16/831,795

(22) Filed: Mar. 26, 2020

(65) Prior Publication Data
US 2020/0313519 A1    Oct. 1, 2020

(51) Int. Cl.
| H02K 11/33 | (2016.01) |
| H02K 5/00 | (2006.01) |
| H02K 7/116 | (2006.01) |
| H02K 9/22 | (2006.01) |
| F02B 37/18 | (2006.01) |

(52) U.S. Cl.
CPC ............... *H02K 11/33* (2016.01); *H02K 5/00* (2013.01); *H02K 7/116* (2013.01); *H02K 9/227* (2021.01); *F02B 37/186* (2013.01)

(58) Field of Classification Search
CPC ......... H02K 11/40; H02K 5/08; H02K 5/225; H02K 7/116; H02K 9/22; H02K 11/33; H02K 15/14; H02K 9/227; H02K 11/02
USPC ........................................... 310/51, 68 R, 71
See application file for complete search history.

(56) References Cited

U.S. PATENT DOCUMENTS

| 5,491,370 | A  | * | 2/1996 | Schneider | H02K 11/33 310/68 R |
| 5,939,807 | A  | * | 8/1999 | Patyk | H02K 5/161 318/400.27 |
| 7,946,555 | B2 | * | 5/2011 | Ikeda | F02D 9/105 324/207.25 |
| 8,129,879 | B2 | * | 3/2012 | Uchimura | H02K 11/026 310/239 |
| 8,779,641 | B2 | * | 7/2014 | Fujii | H02K 29/08 310/68 B |
| 9,647,506 | B2 | * | 5/2017 | Oomori | H02K 7/1166 |

(Continued)

FOREIGN PATENT DOCUMENTS

| DE | 10 2006 041 562 A1 | 3/2008 |
| DE | 10 2007 025 345 A1 | 12/2008 |

(Continued)

OTHER PUBLICATIONS

English abstract for DE-10 2009 053 803.

(Continued)

*Primary Examiner* — John K Kim
(74) *Attorney, Agent, or Firm* — Fishman Stewart PLLC

(57) ABSTRACT

The present disclosure describes a drive circuit for an actuator of an actuator device. The drive circuit includes an interference suppression branch for reducing interferences. The interference suppression branch includes two conductor branches extending along a longitudinal axis and each comprising at least one conductor body. The two conductor branches extend through at least two imaginary conductor alignment sections of the interference suppression branch that are lined up in a row in an axial direction of the longitudinal axis. The two conductor branches have a first portion arranged inside a first conductor alignment section that run obliquely towards one another.

19 Claims, 3 Drawing Sheets

(56) References Cited

U.S. PATENT DOCUMENTS

| | | | |
|---|---|---|---|
| 2005/0088054 A1* | 4/2005 | Hartel | F04B 53/22 |
| | | | 310/239 |
| 2007/0170789 A1* | 7/2007 | Kawarai | H02K 11/026 |
| | | | 310/71 |
| 2007/0283923 A1 | 12/2007 | Khelifati et al. | |
| 2013/0049524 A1* | 2/2013 | Talaski | F04B 17/03 |
| | | | 310/248 |
| 2015/0381016 A1* | 12/2015 | Tsuda | H02K 11/35 |
| | | | 310/68 B |
| 2016/0126680 A1* | 5/2016 | Maeda | H02K 11/0094 |
| | | | 439/620.21 |
| 2018/0241282 A1* | 8/2018 | Niekamp | F02M 35/10157 |
| 2020/0313519 A1* | 10/2020 | Niekamp | H02K 5/00 |
| 2020/0313522 A1* | 10/2020 | Niekamp | H02K 5/08 |

FOREIGN PATENT DOCUMENTS

| | | |
|---|---|---|
| DE | 10 2009 053 803 A1 | 5/2011 |
| DE | 20 2012 013 344 U1 | 6/2016 |
| DE | 10 2015 215 732 A1 | 2/2017 |
| EP | 1 865 173 A2 | 12/2007 |
| WO | WO-2014/090953 | 6/2014 |

OTHER PUBLICATIONS

English abstract for DE-20 2012 013 344.
English abstract for DE-10 2006 041 562.
English abstract for DE-10 2007 025 345.

* cited by examiner

DRIVE CIRCUIT FOR AN ACTUATOR, ACTUATOR DEVICE FOR ADJUSTING AN ADJUSTING ELEMENT, MANUFACTURING METHOD FOR PRODUCING A DRIVE CIRCUIT, AND A MOTOR VEHICLE COMPONENT PRODUCTED ACCORDING TO THE METHOD

CROSS-REFERENCE TO RELATED APPLICATION

This application claims priority to Germany Application No. DE 10 2019 204 291.0 filed on Mar. 27, 2019, the contents of which are hereby incorporated by reference in its entirety.

TECHNICAL FIELD

The invention relates to a drive circuit for an actuator of an actuator device for adjusting an adjusting element, in particular for a motor vehicle. The invention furthermore relates to an actuator device for adjusting an adjusting element, in particular for a motor vehicle. The invention further relates to a manufacturing method for producing a drive circuit of an actuator device, in particular for a motor vehicle, as well as a motor vehicle component produced according to the method.

BACKGROUND

Drive circuits devices of the above-mentioned type serve the purpose of controlling an actuator or generally a drive, so as to adjust an adjusting element, for example by means of the actuator. The adjusting drives for vehicles are virtually always electric motors. The adjusting elements are, for example, valves, turbocharger adjusting elements, such as VTG, VIC or wastegate valves, exhaust flaps, acoustic flaps or also windshield wipers.

Actuator devices of the above-mentioned type usually have a housing, in which an actuator, an adjusting gear connected thereto, as well as a drive circuit for controlling are arranged.

An actuator device of this type comprising power electronics is known from DE 10 2009 053 830 A1, wherein an adjusting device for operating an adjusting element comprising an actuator and comprising a housing made of plastic for receiving the actuator as well as a power electronics for operating the actuator are described.

An adjusting device for adjusting an adjusting element, in particular for a motor vehicle, is known from DE 10 2015 215 732 A1, whereby a controller is described.

An adjusting device for adjusting a flap in an internal combustion engine comprising a housing is described in EP 1 865 173 B1. A gear unit and a drive motor are arranged in the housing. For electrically connecting the drive motor and other electrical and electronic components, the adjusting device has a drive circuit, which is referred to as stamped grid, which has sections of conductor tracks, which are partially extrusion-coated with plastic in the cover.

An actuator comprising a metal housing, an electric motor, an adjusting element, a transfer mechanism adapting the movement of the electric motor to the adjusting element, and an electronic circuit for controlling the electric motor is known from WO 2014/090953 A2. A stamped grid, which has conductor tracks, which serve to contact a sensor and to contact the electric motor, is arranged in the actuator.

Electrical and/or electromagnetic interferences originating from the used actuator, e.g. an electric motor, usually occur during the operation of actuator devices. Interferences of this type influence electrical components, which are arranged in the actuator device. Voltage signals of the components, such as sensors or the like, are distorted or are superimposed with measurement noise. This routinely necessitate a relatively complex signal processing. This can also affect to surrounding/adjacent components/assembly groups, as well as interference-sensitive receiving devices, such as TV receivers, radios or mobile telephones.

To reduce interferences of this type, it is common to use so-called interference suppression circuits. In the case of the drive circuit of the actuator device, so-called electromagnetic compatibility circuits are used in practice, which are also known as EMC circuits or EMC branches.

With the use of an EMC circuit or an EMC branch in a drive circuit, relatively good interference suppression results are already achieved nowadays in any case. However, the known EMC circuits reach structural/physical limits with regard to their interference suppression capacity, even though it would be desirable to be able to provide even better EMC circuits, thus quasi an even better interference suppression, so as to be able to provide, for example, sensor signals from sensors virtually without signal processing.

SUMMARY

The object of the invention thus lies in providing an improved drive circuit for an actuator device.

In the case of the present invention, this object is solved in particular by means of the subject matters of the independent claims. Advantageous embodiments are subject matter of the dependent claims.

A basic idea of the invention is to provide an improved actuator device, in that electrical and/or electromagnetic interferences are reduced. For this purpose, it is provided to optimize the conductor bodies of a drive circuit for an actuator of an actuator device with regard to the orientation thereof in space.

For this purpose, the drive circuit has an interference suppression branch, which has at least two conductor branches, for reducing interferences.

The interference suppression branch is advantageously arranged between the supply device and drive contacts of the actuator, in particular interconnected between them.

It is also conceivable that the interference suppression branch is arranged between two conductor branches, which are directly connected to a supply device, which is not described in more detail, for electrically supplying the actuator and the drive contacts of the actuator.

In any case, the conductor branches are connected to the supply device, for example via a socket of the actuator device.

The interference suppression branch advantageously and practically always comprises a pair of capacitors, which is arranged on contact points, for interference suppression of the actuator.

Each conductor branch comprises at least one conductor body, which advantageously extends along an imaginary longitudinal axis, preferably in the axial direction of an aligning direction arranged parallel to the longitudinal axis.

The interference suppression branch is further divided into at least two imaginary conductor alignment sections, which are preferably aligned in the alignment direction. The conductor branches or the conductor bodies, respectively, extend through these sections.

A first conductor alignment section is advantageously arranged between the supply device or electrical connections of a supply device and the contact points of the capacitor pair.

A second conductor alignment section, which advantageously follows in the alignment direction, is arranged between the contact points of the capacitor pair and the drive contacts of the actuator.

To reduce electrical and/or electromagnetic interferences in the drive circuit, it is provided that the conductor branches arranged inside the first conductor alignment section run obliquely towards one another in the alignment direction.

It is further provided that the conductor branches of the second conductor alignment section run obliquely away from one another in the alignment direction, quasi move away from one another, and lead into the drive contacts of the actuator.

This has the surprising effect that electrical and/or electromagnetic interferences in the drive circuit are reduced. The drive circuit can thus be improved with regard to its electromagnetic compatibility, so that in particular measurements can be performed more accurately with a sensor branch.

To control the actuator, the drive circuit advantageously comprises an interference suppression branch, which serves to reduce electromagnetic interferences, which are caused by the actuator (electric motor).

The drive circuit can advantageously furthermore comprise a sensor branch for detecting and monitoring drive parameters.

A second basic idea of the invention, which can be realized independently of and in particular in addition to or as an alternative to the above first basic idea, is to forego a ground conductor, which is guided to the outside via the system connector plug or which is guided to the superordinate assembly via a conductive housing connection. Instead, a zero-ground potential is used, which is already present inside the actuator device.

For the realization, an actuator device comprising an in particular multi-part housing is provided, which comprises a support body made of plastic material. The support body has a socket, which is formed integrally with the support body, for connection to a plug, a drive receiving space for receiving an actuator, and a gear receiving space for receiving an adjusting gear. A plug, which is in contact with the supply device, can be inserted, for example, into the socket. The receiving spaces of the support body can advantageously each be covered by a housing cover, which is not described in more detail. In any case, an actuator, preferably an electric motor, is arranged in the drive receiving space, and an adjusting gear is arranged in the gear receiving space. The adjusting gear is advantageously coupled to the actuator on the drive side and is coupled to the adjusting element on the output side, so as to convert a drive torque or a drive movement provided by the actuator during the operation of the actuator device to the demands of an adjusting element movement of the adjusting element. A drive circuit is further provided for the operation of the actuator. It comprises an inference suppression branch for reducing interferences and optionally a sensor branch for detecting drive parameters of the actuator, for example the rotational speed. The drive circuit furthermore has electrically conductive conductor bodies for contacting drive contacts of the actuator, for contacting components of the drive circuit, and for contacting the socket.

To be able to forego a ground conductor, which leads to the outside, the drive circuit is equipped with at least one conductor body, which is referred to as contact tongue. The contact tongue establishes an electrical contact between the drive circuit and an, in particular metallic, actuator housing of the actuator. For this purpose, the contact tongue is clamped against the actuator housing, in particular against the housing surface thereof, thus is pretensioned against it or abuts thereon under pretension, respectively. The clamping between the contact tongue and the actuator housing can be promoted, for example, by an elastic deformation of the contact tongue. In any case, the actuator housing serves as zero-ground potential or reference potential for the drive circuit.

This has the effect that an additional ground conductor can be foregone. Due to the missing ground conductor, the drive circuit becomes less complex from a structural aspect. The drive circuit can be made, for example, in a more compact and thus more space-saving manner. The used socket-plug pairing can further be designed to be more compact due to the missing ground conductor, namely with fewer contact pins. The production of the actuator device as a whole is thus slimmer and more cost-efficient.

A further basic idea of the invention is to provide a manufacturing method for producing a drive circuit of an actuator device. The actuator device and the drive circuit can preferably have features according to the claims or according to the description. Several steps are provided as part of the manufacturing method:

1) inserting a stamped grid into the gear receiving space through a gear receiving opening of the gear receiving space, wherein the stamped grid has conductor bodies and connecting elements connecting said conductor bodies to one another, 2) placing the stamped grid onto a bottom-side equipping surface of the gear receiving space, wherein positioning recesses introduced into the conductor bodies engage with positioning pins arranged on the support body, so as to arrange the stamped grid at a predetermined position relative to the support body, and so as to fix the stamped grid transversely to and along a positioning pin longitudinal axis, 3) extrusion coating the drive circuit made from the stamped grid in a plastic injection molding process, wherein the drive circuit is covered completely or at least partially with plastic material, so that a portion of the drive circuit is arranged in the interior of the dividing wall of the support body, 4) equipping the stamped grid with electrical components, wherein the electrical components are held and fixed by holding devices arranged on the conductor bodies, 5) connecting the electrical components to the stamped grid by means of a substance-to-substance bond, wherein the connecting elements of the stamped grid are cut via laser welding, wherein the laser welding beam passes through the gear receiving opening, or alternatively 5a) cutting open the connecting elements of the stamped grid even before the insertion of the stamped grid, in particular before step 1), into the gear receiving space, and direct extrusion coating of the stamped grid, 6) inserting and fastening the actuator and the adjusting gear in the drive receiving space or in the gear receiving space, respectively, wherein the contact tongue is elastically bent in response to the insertion of the actuator, and is pretensioned to an actuator housing of the actuator, so that the contact tongue carves into the actuator housing or scratches it open, so as to establish and/or to improve an electrical contact to the actuator housing.

The invention also comprises motor vehicle components, such as an actuator device or an actuator for motor vehicles, which are produced according to the above-described method steps.

The interference suppression branch can have two or more conductor branches, which extend along a longitudinal axis. Each conductor branch comprises in particular at least one conductor body or is formed by the latter.

The interruption suppression branch is advantageously divided into at least two imaginary conductor alignment sections, which are lined up in a row in the direction of the longitudinal axis. The conductor branches extend, in particular completely, through these conductor alignment sections.

Conductor branches or conductor bodies arranged inside a first conductor alignment section can run obliquely towards one another in any case. The conductor branches or conductor bodies, which are arranged inside a second conductor alignment section following the first conductor alignment section, can further run obliquely away from one another and can in particular lead into the drive contacts of the actuator. Due to this orientation of the conductor branches or conductor bodies, a relatively favorable electromagnetic compatibility (EMC) of the drive circuit is attained. This has the advantage, for example, that a signal processing of sensor signals detected by means of sensors can be realized relatively easily.

A third conductor alignment section is advantageously arranged between the second conductor alignment section and drive contacts of the actuator in the direction of the longitudinal axis. The conductor branches are arranged parallel to one another and/or parallel to the longitudinal axis inside the third conductor alignment section.

It can be provided that at least two capacitor contact points, into which the conductor branches lead, each in an oblique manner based on the longitudinal axis, are arranged at or on an imaginary section boundary between the first and second conductor alignment section.

The conductor branches arranged inside the first conductor alignment section advantageously point in the direction of the capacitor contact points. The conductor branches arranged inside the second conductor alignment section in particular point away from the capacitor contact points in the direction of the actuator contact.

It is possible that the two conductor branches are arranged symmetrically to one another with respect to the longitudinal axis in at least one conductor alignment section. The electromagnetic compatibility (EMC) of the drive circuit is improved thereby.

The conductor branches arranged inside the first conductor alignment section each form an angle A of between 30° and 80°, in particular of 30°, 35°, 40°, 45°, 50°, 55°, 60°, 65°, 70°, 75°, 80° between them and the longitudinal axis. The conductor branches arranged inside the second conductor alignment section further each form an angle B of between 30° and 80°, in particular of 30°, 35°, 40°, 45°, 50°, 55°, 60°, 65°, 70°, 75°, 80° between them and the longitudinal axis. The electromagnetic compatibility (EMC) of the drive circuit is also improved thereby.

The drive circuit comprises a sensor branch, which has in particular one, two or several sensors, for example Hall sensors, for detecting drive parameters of the actuator. For example the rotational speed of the actuator or a rotational angle of the actuator can be detected by means of the sensors.

It is preferably provided that at least one contact tongue abuts directly on an electrically conductive actuator housing of the actuator so as to be pretensioned during operation of the actuator device, so as to establish an electrical contact between the drive circuit and the actuator housing. The contact tongue thus advantageously abuts directly on the actuator housing without superfluous space or gap.

It is further preferred when the contact tongue is a flat body, which is bent in a prong-like manner and which advantageously has two large surfaces oriented in opposite directions, a front surface, and two small surfaces oriented in opposite directions. Due to the prong-like bending of the contact tongue, the contact tongue advantageously towers above the remaining conductor bodies, it quasi protrudes away from the drive circuit. Due to the fact that the contact tongue is bent in a prong-like manner, a large surface of the flat body is advantageously oriented towards the actuator during the operation of the actuator device and is clamped to the actuator housing. In response to the assembly of the actuator in the actuator receptacle, the large surface acts quasi like a ramp in such a way that the actuator glides along the large surface. The actuator can thus glide, for example, towards a centering arrangement, which simplifies the assembly.

The contact tongue further has, in particular over its entire longitudinal body axis, a triangular, a rectangular or a polygonal cross section, based on its longitudinal body axis.

The contact tongue advantageously comprises a first and a second tongue segment. The second tongue segment can be arranged at an angle relative to the first tongue segment, can quasi be bent. A first angle of between 90° and 170°, in particular of 90°, 100°, 110°, 120°, 130°, 140°, 150°, 160° or 170° can in particular be formed between the first and the second tongue segment.

For the interference suppression of the actuator, the interference suppression branch comprises so-called electromagnetic compatibility circuits, which is also described below as EMC circuit or EMC.

It is preferred when the actuator housing of the actuator is metallic and electrically conductive. In this case, it is suitable as zero-ground potential or reference potential for the drive circuit, so that a link or connection of the control circuiting to a zero-ground potential, quasi a ground link, can be realized.

The contact tongue has in particular at least one groove edge, for forming grooves in, carving into or scratching open the housing surface. The groove edge scratches over the actuator housing, in particular in response to the assembly of the actuator, and establishes a metallic contact to the actuator housing, for example also when the actuator housing is coated or lacquered. This has the advantage that the electrical contact between the contact tongue and the actuator housing is improved.

The groove edge is advantageously oriented in the direction of the actuator and is clamped to a housing surface of the actuator housing. It is attained thereby that the groove edge is arranged on the actuator housing and that a metallic contact is always established between the contact tongue and the actuator housing.

The groove edge can cut into a housing surface of the actuator housing in any case, so as to establish an electrical contact between the contact tongue and the actuator housing. This has the effect that the connection to the zero-ground potential is free from interferences, such as, for example, interferences caused by transition resistances. This has the advantage that the interference suppression of the drive circuit can be realized relatively easily and with high quality.

The groove edge of the contact tongue is preferably embodied to be sharp or pointy in a knife-like manner. It can thus cut relatively easily into a housing surface of the actuator. This has the advantage that the connection to the zero-ground potential can be established even if the housing surface of the actuator has, for example, relatively thick coatings or adhesive labels.

It is possible that the contact tongue is clamped to the actuator housing in a flexible or and bendable manner and during the operation of the actuator device. The contact tongue can in particular clamp to the actuator housing in a spring-like manner. The flat body of the contact tongue is in particular an elastically deformable bending rod. This has the advantage that the contact tongue can compensate, for example, dimensional deviations of the actuator housing in the region of the clamping.

It is preferred when the contact tongue is arranged in an interference suppression branch of the drive circuit, so as to provide a zero-ground contact for the interference suppression or a reference potential for signal and operating voltages. The contact tongue can thus be arranged relatively close to the actuator, because the interference suppression branch is conveniently always arranged directly on the actuator. This has the advantage that the contact tongue can be produced in a relatively compact manner with regard to its structural dimensions.

The contact tongue can further contact the actuator housing in the region of DC motor brushes of the actuator. This also promotes the structural dimensions of the contact tongue, because the DC motor brushes are usually arranged relatively close to the interference suppression branch.

The drive circuit can be arranged completely or at least partially in the interior of a dividing wall of the support body, which separates the drive receiving space and the gear receiving space from one another. The drive circuit is thus fastened to the support body in a virtually non-releasable manner on the one hand and is protected against environmental influences on the other hand.

The drive circuit is advantageously made of a stamped grid arranged in the gear receiving space. The stamped grid comprises the conductor bodies and in particular the connecting elements connecting the conductor elements to one another. The stamped grid can be arranged in the interior of the dividing wall in a non-releasable manner by means of a plastic injection molding process. This has the advantage that other connecting means, such as connecting screws, can be forgone.

To connect the actuator to the drive circuit in a relatively uncomplicated manner, it can be provided that at least one contact tongue is arranged outside of the dividing wall. The contact tongue advantageously protrudes from the dividing wall in this case, for example into the drive receiving space. This has the advantage that the actuator can be inserted into the drive receiving space as part of the assembly, wherein the contact tongue and the actuator housing come into contact with one another virtually without further effort in such a way that the contact tongue abuts on the actuator housing in a clamping manner.

At least one connecting section of the drive circuit and an actuator-side drive supply section of the drive circuit, and one or several holding devices of the drive circuit for holding electrical components can further be arranged outside of the dividing wall. This has the effect that the connecting section, the drive supply section, and the holding devices can be accessed relatively easily, for example to equip the holding devices with electrical components.

The drive receiving space can also be referred to as actuator receiving space. The actuator could likewise be referred to as drive.

The drive supply section of the drive circuit can in particular have a pair of spring bodies for contacting the drive contacts of the actuator. Each spring body is thereby advantageously arranged integrally on a conductor body of the drive circuit. Each spring body can have one or several elastic spring protrusions for contacting the drive supply section. The spring protrusions are arranged on an, in particular annular spring body holder, for example in a web-like manner and advantageously protrude into an annular opening of the spring body holder.

It can be provided that the drive circuit arranged in the dividing wall or the stamped grid is arranged between a heat sink for cooling the actuator and the gear receiving space. It is also conceivable that the heat sink is arranged between the gear receiving space and the drive circuit or the stamped grid. A cooling of the actuator can be attained in any case by means of the heat sink during operation of the actuator device. It is in particular conceivable that the drive circuit is additionally cooled by means of the heat sink.

The conductor bodies of the drive circuit in particular have one or several integral holding devices for holding electrical components, wherein the holding devices each have a pair of holding bodies, which jointly supports and fixes an electrical component. Electrical components, for example capacitors, can thus be attached to a drive circuit blank, which is not yet equipped with electrical components, without necessitating further tools. This has the advantage that the production of the drive circuit is quicker and thus more cost-efficient.

Advantageously, one or, in the alternative, each holding body comprises a component receptacle for supporting a connecting section of an electrical component. The component receptacles each have a receiving opening for the guide-through of the connecting section, and a support bed for applying and fixing a connecting section. The support bed has in particular a C-shaped, U-shaped, V-shaped or keyhole-shaped contour.

It can be provided that one or advantageously each holding body is bent in the direction of a gear receiving opening of the gear receiving space. The holding bodies thus point in the direction of the gear receiving opening, so that electrical components can be inserted into and positioned on the holding devices through the gear receiving opening. This has the advantage that the drive circuit can be equipped with electrical components, for example, by hand or by means of corresponding automation.

The drive circuit can be made of a stamped grid arranged in the gear receiving space. The stamped grid advantageously comprises the conductor bodies and the connecting elements connecting said conductor bodies to one another.

The stamped grid can in particular have several positioning recesses, with which positioning pins engage, which are arranged on the support body. The stamped grid can thus be arranged at a predetermined or predeterminable position relative to the support body, wherein the stamped grid is fixed transversely to and along a positioning pin longitudinal axis. On the one hand, the stamped grid can thus not slip relative to the support body. On the other hand, the positioning recesses and positioning pins ensure a high automation capacity of the production process, because the stamped grid is always arranged at the same position.

It can further be provided that the positioning pins are arranged at a bottom surface, which is limited by a jacket surface of the gear receiving space.

It is conceivable that one or several pairs of positioning recess and positioning pin each have a transition or interference fit, so as to fix and position the stamped grid.

In addition to mechanical components, such as the adjusting gear and the actuator, the actuator device has electrical and electronic components, so that the actuator device can also be referred to as an electromechanical actuator device.

The receiving spaces each have a receiving opening, through which the actuator or the adjusting gear can be inserted. The receiving openings can advantageously each be covered by means of a housing cover.

The socket can be arranged on the side of the actuator device, which faces the drive receiving space.

The contact tongue can contact the actuator housing on a centering arrangement or a centering section of the actuator. The centering section is, for example, a centering collar of the actuator for positioning and centering the actuator on the support body.

The centering collar is advantageously permeated, in particular axially, by an actuator shaft.

To fix the actuator arranged in the drive receiving space to the support body, the actuator can be pretensioned to the actuator housing by a spring arrangement, for example a wave spring, which is arranged in the drive receiving space. The spring arrangement is thereby supported on the actuator on the one hand and on a housing cover closing the drive receiving space on the other hand. It is attained thereby that the actuator is tensioned in the direction of the support body.

If it has elastic properties, the contact tongue can be pretensioned to the actuator housing. This has in particular the effect that the actuator housing is tensioned to the support body, in particular transversely to an actuator shaft of the actuator.

In summary, it should be noted: The present invention relates to a drive circuit for an actuator 60 of an actuator device 10 for adjusting an actuator, in particular for a motor vehicle. It comprises an interference suppression branch 81 for reducing electromagnetic interferences. The interference suppression branch 81 has two conductor branches 83, 84, which extend along a longitudinal axis 77. It is essential for the invention that the interference suppression branch 81 is divided into at least two conductor alignment sections 87, 88, which are lined up in a row and through which the two conductor branches 83, 84 extend. The conductor branches 83, 84 arranged in a first conductor alignment section 87 thereby run obliquely towards one another. The conductor branches 83, 84 arranged in a second conductor alignment section 88, which follows the first conductor alignment section 87, run obliquely away from one another, whereby a reduction of the electromagnetic interferences can be attained.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
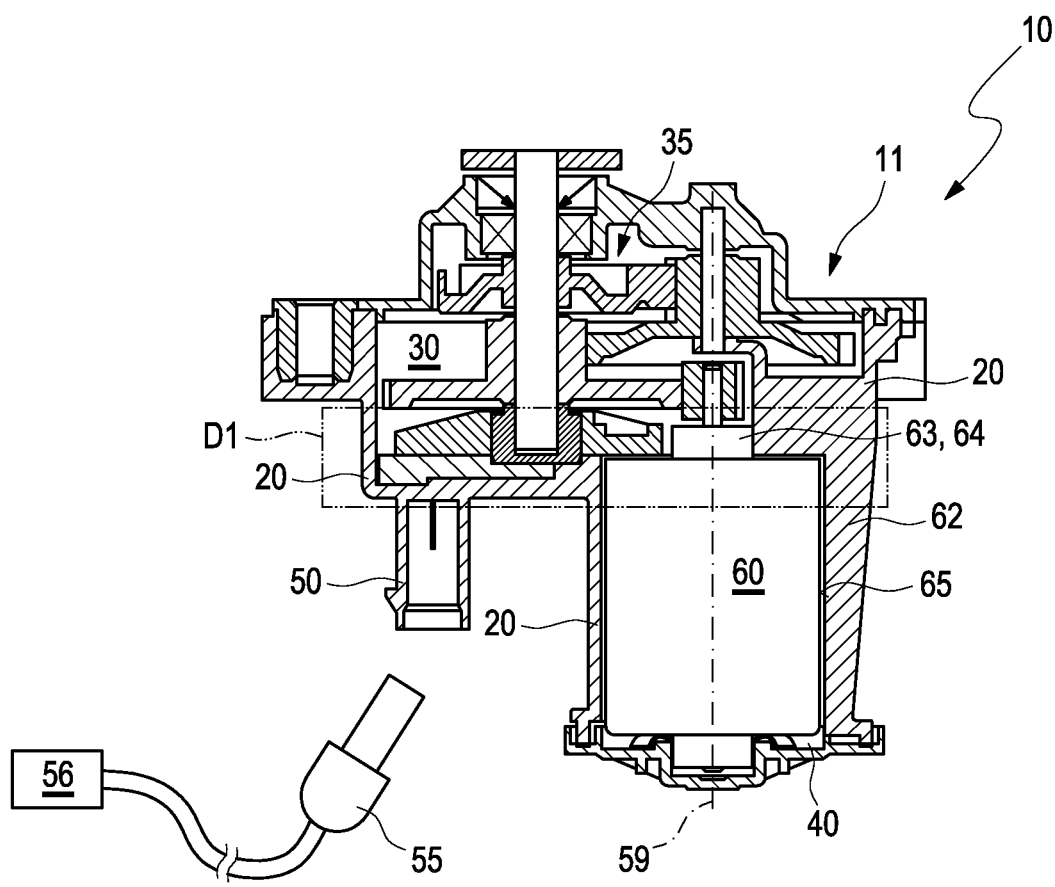
FIG. 1 shows a sectional view of an actuator device.
Figure 2:
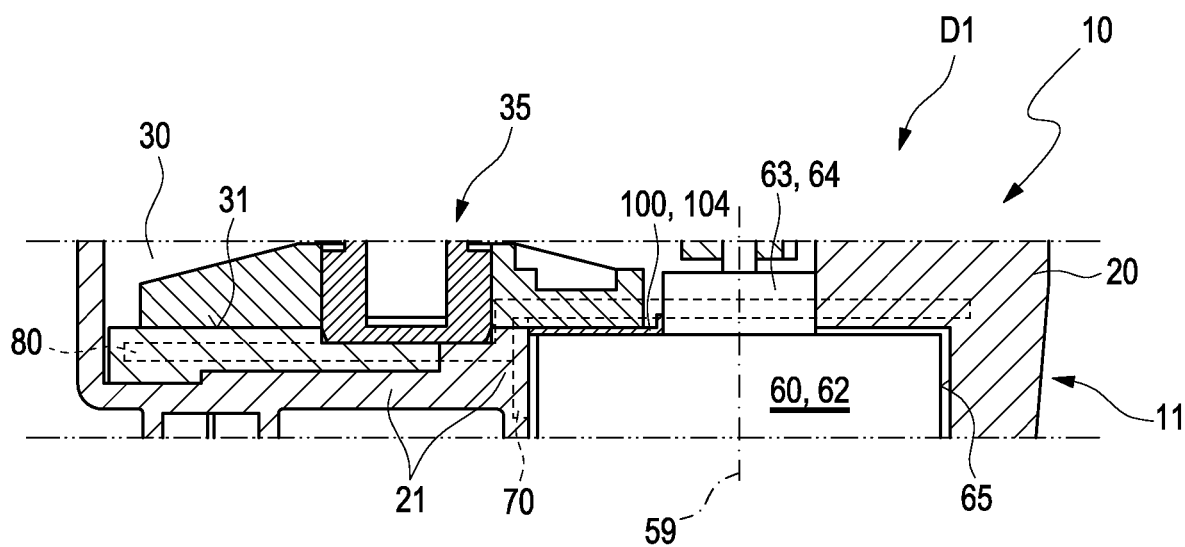
FIG. 2 shows a detail D1 of the actuator device according to FIG. 1.

An exemplary embodiment of an actuator device 10 is illustrated in the drawing, which serves to operate a non-illustrated adjusting element. Adjusting elements of this type are used in particular in the case of motor vehicles, for example in valves or for example in the case of wastegate, VTG or VIC boost pressure controls, in the case of exhaust flaps and acoustic flaps or also in the case of windshield wipers.

The actuator device 10 comprises an in particular multi-part housing 11, which has a support body 20, which is advantageously made of a plastic material. It is conceivable that the support body 20 is produced, for example, as part of an injection molding process.

In any case, the actuator device 10 furthermore comprises an actuator 60, an adjusting gear 35, and a drive circuit 80 for supplying and controlling the actuator 60.

The support body 20 has an actuator receiving space 40, which can advantageously be closed by means of a housing cover, which is not described in more detail, and a gear receiving space 30, which can likewise be closed by means of a housing cover, which is not described in more detail. The gear receiving space 30 has a jacket surface and a bottom-side equipping surface 31.

A socket 50 is furthermore arranged on the support body 20. Said socket is advantageously formed as integral part of the support body 20, thus quasi in one piece with the support body 20.

The socket 50 is advantageously made of a plastic material, in particular of the same plastic material, of which the support body 20 is made.

Based on a non-illustrated longitudinal axis of the socket 50, the socket 50 preferably has an, in particular thin-walled, hollow-cylindrical cross section. In the case of sockets in two rows, which are not illustrated in the drawing, the plug geometry can be arranged so as to be rotated by 90° about a vertical axis, so that the socket can quasi be engaged from one side.

In any case, the socket 50 is designed in such a way that a suggested plug 55 can be attached to it. The actuator 60 and the drive circuit 80 described further below can thus be connected to a supply device 56.

The supply device 56 provides in particular energy for the actuator. As an example, the supply device 56 can comprise evaluating means for sensors 78, 79.

The support body 20 advantageously has a dividing wall 21, which is arranged between the gear receiving space 30 and the actuator receiving space 40. The dividing wall 21 quasi separates the two receiving spaces 35, 40 from one another.

As an example, the actuator 60 is a DC electric motor.

The virtually cylindrical actuator 60 extends along an actuator shaft longitudinal axis 59 and comprises an actuator housing 62 as well as a motor centering collar 63.

The actuator 60 provides a drive movement or a drive torque for an operation of the adjusting element of the actuator device 10, wherein the actuator 60 is firmly arranged in the drive receiving space 40 of the support body 20 in the operating state of the actuator device 10.

The actuator housing 62 is limited by a jacket surface in the radial direction and by two front surfaces, which are not identified in more detail, in the axial direction. The motor centering collar 63 is arranged at one of the two front surfaces.

The actuator 60 is advantageously inserted into the drive receiving space 40, leading with the front surface, which supports the motor centering collar 63. At the second front surface of the actuator 60, which is oriented opposite to the first front surface, a spring arrangement, for example a wave spring, is advantageously arranged, which is supported on the housing cover. The actuator 60 can be clamped to the support body 20 by means of said spring arrangement.

The actuator device 10 furthermore has the adjusting gear 35, which is arranged in the gear receiving space 30 of the support body 20. The adjusting gear 35 is advantageously coupled to the adjusting gear 60 on the drive side, and to the adjusting element on the output side. A drive torque provided by the actuator 60 during operation of the actuator device 10 or a drive movement is thereby adapted to the demands of the adjusting element.

The actuator device 10 furthermore has a heat sink 70, which is, for example, a cooling water duct. In FIG. 1, the heat sink 70 is suggested by a dashed rectangular box. It provides the advantage that the actuator 60 can be cooled during operation.

The actuator device 10 furthermore has the above-mentioned drive circuit 80. The latter serves in particular for supplying the actuator 60 with energy, which is provided by the supply device 56. Sensors 78, 79 can further be controlled with it. The drive circuit 80 could thus also be referred to as a sensor/control circuit.

The drive circuit 80 is advantageously arranged, quasi in the interior, of the dividing wall 21. It extends in particular from the socket 50 to the actuator receiving space 40. The drive circuit 80 is also illustrated by a body suggested by means of dashed lines.

Figure 3:
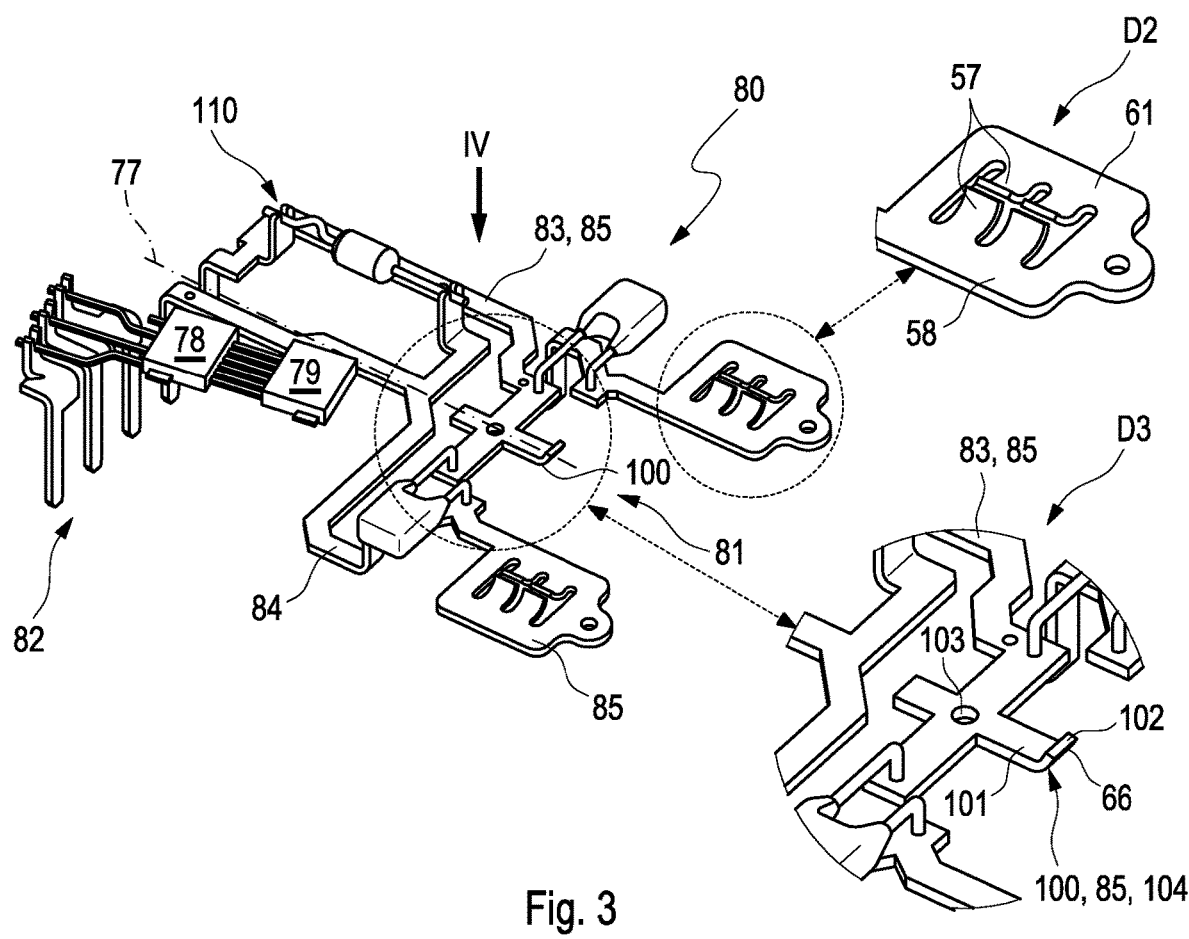
FIG. 3 shows a perspective view of the drive circuit as well as details D2 and D3 of the drive circuit.

A perspective view of the drive circuit 80 as well as details D2 and D3 can be seen in FIG. 3. A drive circuit 80 of this type is arranged, for example, in the support body 20 in the dividing wall 21.

The drive circuit 80 essentially has an interference suppression branch 81 and a sensor branch 82 comprising sensors 78, 79.

The interference suppression branch 81 serves for the interference suppression of the actuator 60 and comprises a first and a second electrical branch 83, 84. The conductor branches 83, 84 extend along a longitudinal axis 77, whereby they each comprise at least one conductor body 85.

The drive circuit 80 can have different electrical components. As an example, the interference suppression branch 81 comprises two capacitors. The drive circuit 80 optionally comprises a further capacitor.

In any case, the interference suppression branch 80 is divided into at least two imaginary conductor alignment sections 87, 88, which are aligned in the axial direction of an alignment direction 86, which is arranged parallel to the longitudinal axis 77. According to FIG. 5, a third conductor alignment section 89 is additionally illustrated in addition to the second conductor alignment section 88.

Figure 4:
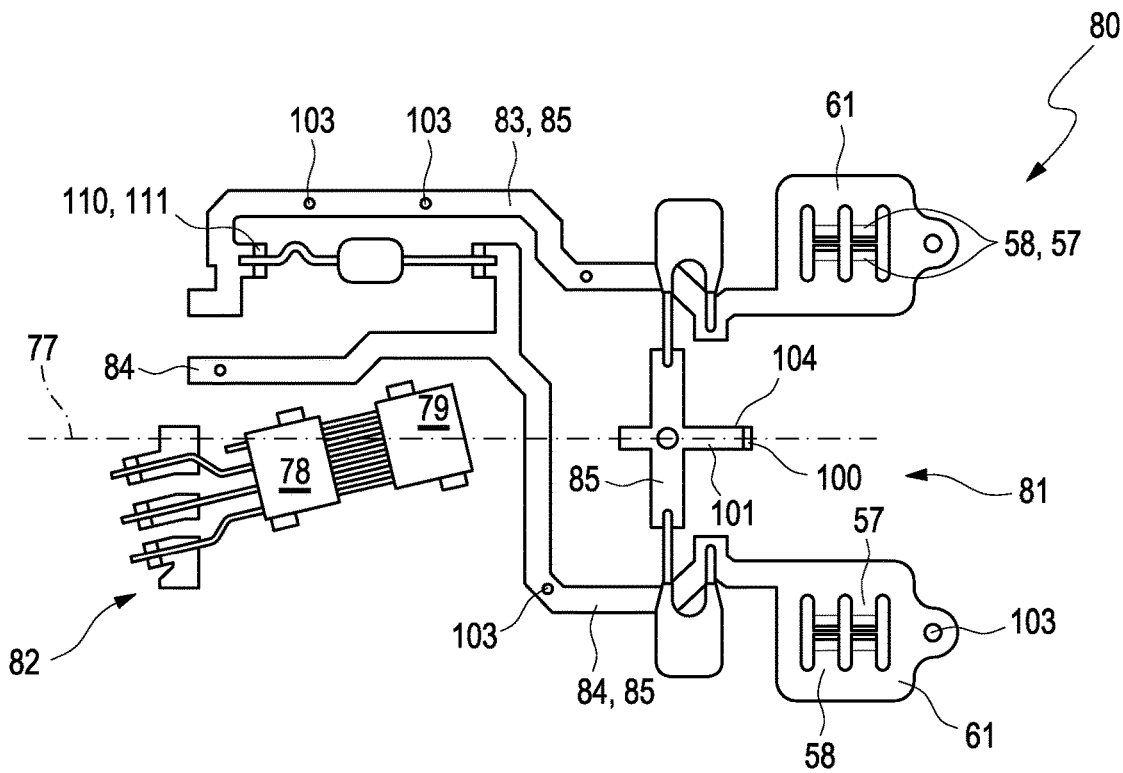
FIG. 4 shows the drive circuit from FIG. 3 in a top view according to arrow IV.

It can be seen according to FIGS. 4 and 5 that the conductor branches 83, 84 extend through the first conductor alignment section 87, through the conductor alignment section 88, and subsequently through the conductor alignment section 89.

Inside the first conductor alignment section 87, the conductor branches 83, 84 run obliquely towards one another in the direction of the alignment direction 86. They then advantageously lead into capacitor contact points 90, which are located, for example, on a boundary between the conductor alignments sections 87, 88 referred to as section boundary. The conductor branches 83, 84 quasi run towards the capacitor contact points 90. One capacitor of the interference suppression branch 80 is in each case arranged at two capacitor contact points 90.

Inside the second conductor alignment section 88, which follows the first conductor alignment section 87, the conductor branches 83, 84 run obliquely away from one another, thus apart from one another, in the alignment direction 86. The conductor branches 83, 84 quasi run from the capacitor contact points 90 in the direction of the actuator contact. Advantageously, they then lead into drive contacts of the actuator 60.

The conductor branches 83, 84 arranged in the third conductor alignment section 89 are arranged parallel to one another and/or parallel to the longitudinal axis 77. Advantageously, the conductor alignment section 89 is optional.

According to the drawing, the two illustrated conductor branches 83, 84 are arranged symmetrically to one another relative to the longitudinal axis 77. It is also conceivable that they are arranged symmetrically only in at least one of the conductor alignment sections 87, 88, 89.

Figure 5:
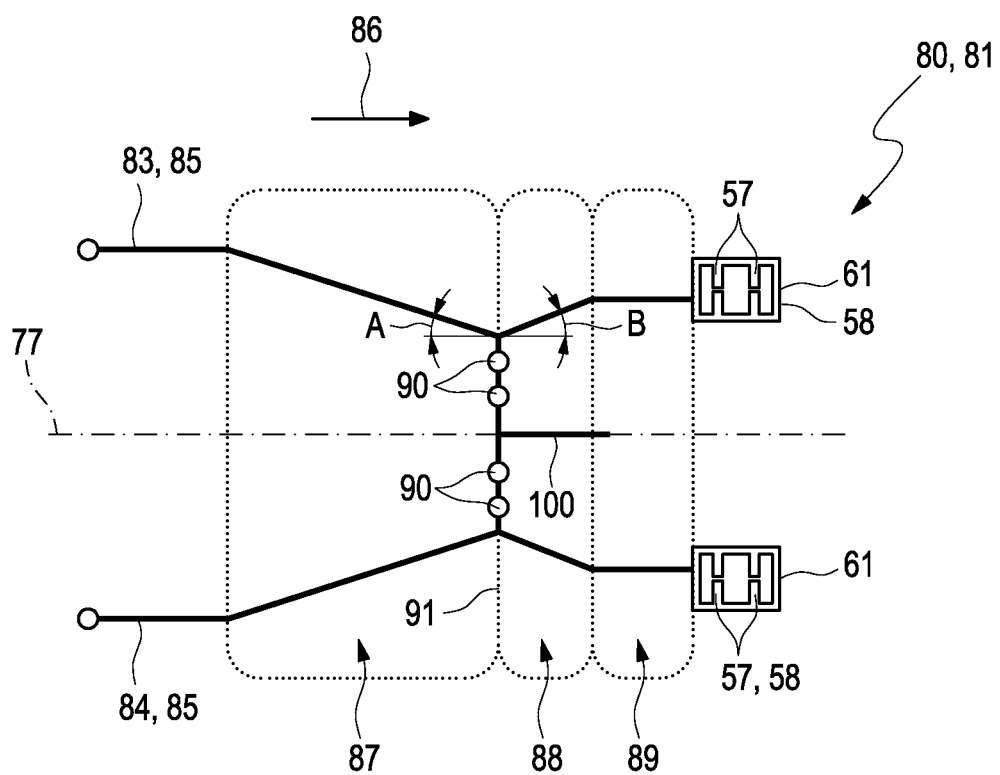
FIG. 5 shows a schematic drive circuit in a top view.

According to FIG. 5, the conductor branches 83, 84 inside the first conductor alignment section 87 each form an angle A between them and the longitudinal axis 77, which, as an example, is approximately 30°. Angles of between 30° and 80°, in particular of 30°, 35°, 40°, 45°, 50°, 55°, 60°, 65°, 70°, 75°, 80° are conceivable.

According to FIG. 5, the conductor branches 83, 84 inside the second conductor alignment section further each form an angle B between them and the longitudinal axis 77, which, as an example, is approximately 30° or 40°. Angles of between 30° and 80° are conceivable, in particular of 30°, 35°, 40°, 45°, 50°, 55°, 60°, 65°, 70°, 75°, 80°.

A contact tongue 100 is advantageously arranged at the interference suppression branch 80, which, according to the drawing, can be an integral part of the drive circuit 80. The contact tongue 100 is clamped to the actuator housing 62 during operation of the actuator device 10, which can be seen, for example, in detail D1. As an example, the contact tongue 100 contacts the actuator 60 in the region of the motor centering collar 63.

A drive contact 61 for the actuator 60 is illustrated in detail D2. Each drive contact 61 advantageously has a pair of spring bodies 58 for contacting the actuator 60. Each spring body 58 is thereby advantageously arranged integrally on a conductor body 85 of the drive circuit 80. Each spring body 58 can have one or several elastic spring protrusions 57 for contacting the actuator 60. The spring protrusions 57 are arranged, for example, in a web-like manner, on the spring body 58, and advantageously protrude into an annular opening of the spring body 58.

According to detail D3, the contact tongue 100 is bent and has a rectangular cross section along its longitudinal body axis as well as across a rectangular front surface.

As an example, the contact tongue 100 is embodied as flat body 104. The flat body 104 is in particular of a cuboid design.

The contact tongue 100 has a first tongue segment 101 and a second tongue segment 102, wherein the second tongue segment 102 is arranged at an angle relative to the first tongue segment 101.

It is not illustrated that the contact tongue 100 has at least one groove-forming groove edge, which is oriented in the direction of the actuator 60, so as to improve or establish the electrical contact.

The conductor bodies 85 of the drive circuit 80 have several positioning recesses 103, which engage with non-illustrated positioning pins, which are arranged on the support body 20, so as to arrange them at a predetermined position relative to the support body 20 and so as to fix them transversely to and along a non-illustrated positioning pin longitudinal axis.

Figure 6:
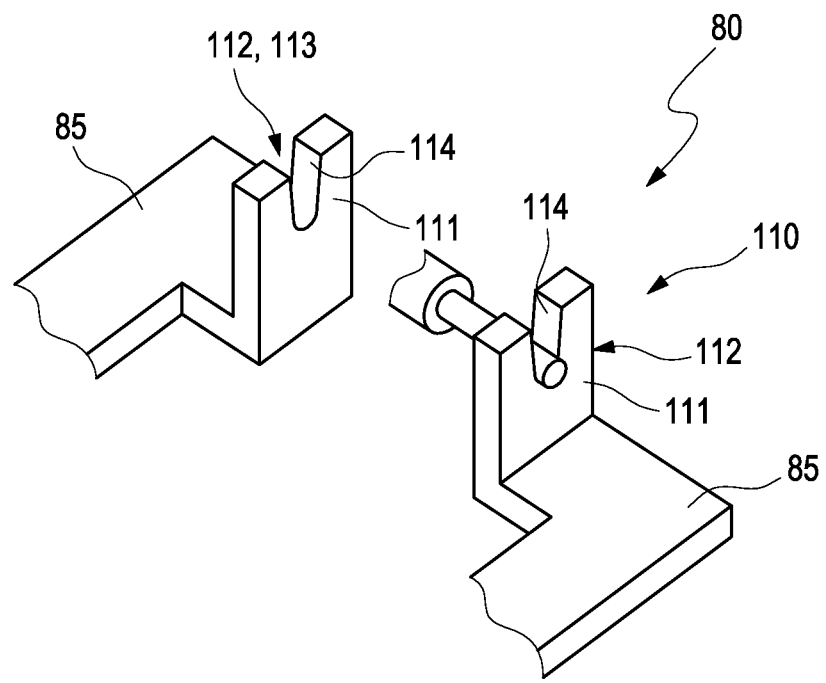
FIG. 6 shows a perspective view of a holding device.

A holding device 110 can be seen in FIG. 6, which serves for holding electrical components. As an example, an electrical component is suggested, which is held and fixed in the holding device 110.

Holding devices 110 are advantageously integral part of the conductor bodies 85 of the drive circuit 80, thus quasi arranged thereon in one piece. It is conceivable that the holding devices 110 are produced together with the conductor bodies 85 in a stamping process, for example of a non-illustrated stamped grid.

In any case, a holding device 110 advantageously has a pair of holding bodies 111, which jointly supports and fixes an electrical component. The holding bodies 111 form a component receptacle identified with 112 for supporting a connecting section of an electrical component. The component receptacle 112 thereby has a receiving opening 113 for the guide-through of the connecting section.

Each holding body 111 comprises an, in particular C-shaped, U-shaped, V-shaped or key hole-shaped support bed 114, which serves for placing and fixing a connecting section.

The invention claimed is:

1. An actuator device for a motor vehicle, comprising:
a housing including a support body of plastic material, the support body having a drive receiving space for receiving an actuator and a gear receiving space for receiving an adjusting gear,
an actuator arranged in the drive receiving space for driving an adjusting element,
a drive circuit for operating the actuator,
the drive circuit including a plurality of electrically conductive conductor bodies structured and arranged to contact drive contacts of the actuator, to contact components of the drive circuit, and to contact a supply device,
the drive circuit further including an interference suppression branch for reducing interferences,
the interference suppression branch including two conductor branches that extend along a longitudinal axis of the interference suppression branch and each comprise at least one conductor body,
the interference suppression branch divided into at least two imaginary conductor alignment sections that are lined up axially relative to the longitudinal axis in a row in an alignment direction arranged parallel to the longitudinal axis, wherein the two conductor branches extend through the at least two imaginary conductor alignment sections,
wherein each of the two conductor branches respectively have a first portion arranged inside a first conductor alignment section of the at least two imaginary conductor alignment sections running obliquely towards one another relative to the longitudinal axis, and
at least two capacitor contact points arranged at an imaginary section boundary between the first conductor alignment section and a second conductor alignment section, wherein the two conductor branches lead into the at least two capacitor contact points in an oblique manner relative to the longitudinal axis.

2. The actuator device according to claim 1, wherein at least one of:
the two conductor branches have a second portion arranged inside a second conductor alignment section of the at least two imaginary conductor alignment sections running obliquely away from one another and lead into the drive contacts of the actuator, wherein the second conductor alignment section follows the first conductor alignment section in the axial direction, and
the two conductor branches have a third portion arranged inside a third conductor alignment section of the at least two imaginary conductor alignment sections running at least one of parallel to one another and parallel to the longitudinal axis, wherein the third conductor alignment section is arranged between the second conductor alignment section and the drive contacts in the axial direction of the longitudinal axis.

3. The actuator device according to claim 1 wherein the first portion of the two conductor branches arranged inside the first conductor alignment section point in a direction of the at least two capacitor contact points.

4. The actuator device according to claim 1 wherein the second portion of the two conductor branches arranged inside the second conductor alignment section point from the at least two capacitor contact points in a direction of the drive contacts of the actuator.

5. The actuator device according to claim 1, wherein the two conductor branches are arranged symmetrical to one another relative to the longitudinal axis in at least one of the at least two imaginary conductor alignment sections.

6. The actuator device according to claim 1, wherein the first portion of at least one of the two conductor branches arranged inside the first conductor alignment section defines a first angle of between 30° and 80° relative to the longitudinal axis.

7. The actuator device according to claim 2, wherein the second portion of at least one of the two conductor branches arranged inside the second conductor alignment section defines a second angle of between 30° and 80° relative to the longitudinal axis.

8. An actuator device for a motor vehicle, comprising:
a housing including a support body of plastic material, the support body having a drive receiving space for receiving an actuator and a gear receiving space for receiving an adjusting gear,
an actuator arranged in the drive receiving space for driving an adjusting element,
a drive circuit for operating the actuator,
the drive circuit including a plurality of electrically conductive conductor bodies structured and arranged to contact drive contacts of the actuator, to contact components of the drive circuit, and to contact a supply device,
the drive circuit further including an interference suppression branch for reducing interferences,
the interference suppression branch including two conductor branches that extend along a longitudinal axis of the interference suppression branch and each comprise at least one conductor body,
the interference suppression branch divided into at least two imaginary conductor alignment sections that are lined up axially relative to the longitudinal axis in a row in an alignment direction arranged parallel to the longitudinal axis, wherein the two conductor branches extend through the at least two imaginary conductor alignment sections, wherein each of the two conductor branches respectively have a first portion arranged inside a first conductor alignment section of the at least two imaginary conductor alignment sections running obliquely towards one another relative to the longitudinal axis, and at least one conductor body arranged on the drive circuit, the at least one conductor body structured as a contact tongue and arranged to abut on an electrically conductive actuator housing of the actuator in a pretensioned manner during operation of the actuator device to provide an electrical contact between the drive circuit and the actuator housing, wherein the actuator housing provides a zero-ground potential or a reference potential.

9. The actuator device according to claim 8, wherein the contact tongue of the at least one conductor body is a flat body that is bent in a prong-like manner and has a triangular, a rectangular or a polygonal cross section relative to a longitudinal body axis.

10. The actuator device according to claim 8, wherein the contact tongue of the at least one conductor body includes a first tongue segment and a second tongue segment, wherein the second tongue segment is arranged at an angle relative to the first tongue segment such that the first tongue segment and the second tongue segment define an angle of between 90° and 170° therebetween.

11. The actuator device according to claim 8, wherein at least one of:

the contact tongue has at least one groove edge oriented in a direction of the actuator and pretensioned against a housing surface of the actuator housing for forming grooves in, carving into or scratching open the housing surface, and the contact tongue is pretensioned elastically against the actuator housing such that a groove edge of the contact tongue cuts into a housing surface of the actuator housing to establish an electrical contact between the contact tongue and the actuator housing.

12. The actuator device according to claim 8, wherein the contact tongue can be bent in a spring-like manner and pushes against the actuator housing during operation under pretension and pretensions the actuator housing against the support body.

13. The actuator device according to claim 8, wherein at least one of:

the contact tongue is arranged in the interference suppression branch of the drive circuit to provide a zero-ground contact for interference suppression or a reference potential for signal and operating voltages, and the contact tongue contacts the actuator housing in a region of DC motor brushes of the actuator.

14. The actuator device according to claim 8, wherein the drive circuit is arranged at least partially in an interior of a dividing wall of the support body, wherein the dividing wall separates the drive receiving space and the gear receiving space from one another.

15. The actuator device according to claim 14, wherein at least one connecting section of the drive circuit, an actuator-side drive supply section of the drive circuit, at least one holding device of the drive circuit for holding electrical components, and the contact tongue are each arranged outside of the dividing wall.

16. The actuator device according to claim 14, wherein the drive circuit is arranged between a heat sink for cooling the actuator and the gear receiving space to provide a cooling of at least one of the drive circuit and of the actuator during operation.

17. The actuator device according to claim 8, wherein:

the at least one conductor body of each of the two conductor branches has at least one integral holding device for holding electrical components, and the at least one holding device of each of the two conductor branches comprise a pair of holding bodies that support and fix a corresponding one of the electrical components.

18. The actuator device according to claim 17, wherein:

each holding body includes a component receptacle for supporting a connecting section of the corresponding electrical component, and the component receptacle has a receiving opening for a guide-through of the connecting section, and a support bed for applying and fixing a connecting section.

19. The actuator device according to claim 8, wherein the drive circuit comprises a stamped grid arranged in the gear receiving space and has the two conductor branches, and wherein at least one of:

the stamped grid has a plurality of positioning recesses that engage with positioning pins arranged on the support body to arrange the stamped grid at a predetermined position relative to the support body and to fix the stamped grid transversely to and along a positioning pin longitudinal axis, and the positioning pins are arranged on a bottom-side equipping surface defined by a jacket surface of the gear receiving space.

\* \* \* \* \*